(12) United States Patent
Hsu

(10) Patent No.: US 7,177,460 B2
(45) Date of Patent: Feb. 13, 2007

(54) STRUCTURE FOR SOPHISTICATED SURVEYING INSTRUMENT WITH COORDINATE BOARD FOR POSITION IDENTIFICATION

(76) Inventor: Chun-Yun Hsu, Taoyuan (TW)

( * ) Notice: Subject to any disclaimer, the term of this patent is extended or adjusted under 35 U.S.C. 154(b) by 622 days.

(21) Appl. No.: 10/384,570

(22) Filed: Mar. 11, 2003

(65) Prior Publication Data

US 2004/0179208 A1     Sep. 16, 2004

(51) Int. Cl.
    *G06K 9/00*     (2006.01)
(52) U.S. Cl. ..................................... 382/152
(58) Field of Classification Search ................. 382/152
    See application file for complete search history.

(56) References Cited

U.S. PATENT DOCUMENTS 4,812,666 A * 3/1989 Wistrand ............... 250/559.36
6,175,647 B1 * 1/2001 Schick et al. ............... 382/154
2004/0240754 A1 * 12/2004 Smith et al. ................ 382/286

* cited by examiner

*Primary Examiner*—Joseph Mancuso
*Assistant Examiner*—Jordan Kuhn
(74) *Attorney, Agent, or Firm*—Troxell Law Office, PLLC

(57) ABSTRACT

A sophisticated surveying instrument consists of a workbench, a coordinate board and two optical sensors. The workbench fastened to a coordinate board with several square grids of equal size forms a connected surveying instrument. Inside the grid there is a readable icon recognizable for the apex coordinate. One of the two optical sensors projects against the workbench to define the starting point and end point of the object while the other against the coordinate, so as to identify the recognizable icon within the projected pixel block on the coordinate board and enter the projected image into an electronic computer for comparison, analysis and conversion, thus identifies the position of the pixel block's center on the coordinate board, defining the corresponding value of the starting point and end point.

3 Claims, 4 Drawing Sheets

STRUCTURE FOR SOPHISTICATED SURVEYING INSTRUMENT WITH COORDINATE BOARD FOR POSITION IDENTIFICATION

FIELD OF THE INVENTION

The present invention relates to a sophisticated surveying instrument, especially a delicate surveying instrument that identifies the pinpoint with a coordinate board, in place of existing measurement done with a linear sensor (linear ruler, resistance ruler), thus enhances the accuracy of measurements.

BACKGROUND OF THE INVENTION

Traditionally, when measuring a tiny object, the surveying instruments used are often those with a vernier caliper whose accuracy ranges within 0.05 mm or 0.01 mm. In case more accurate measurement is required, a more sophisticated surveying instrument is needed, such as a surveying instrument with a linear sensor. For such surveying instruments that measures with a linear sensor, the workbench moving on a plane by means of an orthogonal gliding track can be implemented manually or through the movement of the screw shaft and that the linear sensor (optical ruler, resistance ruler) measures the distance of the displacement. Such a linear sensor, however, must be adjusted horizontally for its position in light of the platform and is not allowed to move in case any size inaccuracy and mismatch occurs. Thus, to some extent an error is caused in the result of the measurement and the accuracy of the measurement is reduced.

SUMMARY OF THE INVENTION

In view of the installation error and mismatch found in traditional linear sensors that cause the measurement inaccurate, the main objective for the present invention is to provide a "sophisticated surveying instrument with a coordinate board for position identification" in place of traditional measurement done by a linear sensor (optical ruler, resistance), so as to improve the weakness of the measurement and enhance accuracy.

This present invention fastens a connected coordinate board under the workbench. Manufactured by the delicate wafer instrument, the coordinate board is broken down into several grids within which readable recognizing icons are marked (such as symbols, bar cods). With two sets of optical sensors (CCD, CMOS) projecting against the workbench and the coordinate board respectively, the object to be surveyed is placed on the workbench. One set of the optical sensor launches the definition for the starting pinpoint while the other set that projects against the pixel block on the coordinate board identifies the recognizable icons in the block. By inputting the icons into an electronic computer for comparison, analysis and conversion, the position of the center of the pixel block corresponding to the coordinate board is identified and the corresponding coordinate value of the object surveyed is defined. As the workbench moves, enabling the optical sensor to project against the end point of the object surveyed, the corresponding coordinate board is moved. In this way, the pixel block of the fixed optical sensor is projected against another position on the coordinate board. At this moment, the projected pixel block on the coordinate board also identifies the recognizable icons within the block and input them into an electronic computer for comparison, analysis and conversion. Thus, the position of the center of the pixel block against the coordinate board is identified, the corresponding coordinate value of the end point being defined, and the displacement distance between the starting point and the end point of the object is measured. This present invention replaces traditional measurement done by a linear sensor, while at the same time maintains the accuracy of measurement without being influenced by the size error or mismatch of the workbench track.

In the following, the embodiment illustrated is used to describe the detailed structural characteristics and operation action for the present invention.

DETAILED DESCRIPTION OF THE INVENTION

Figure 1:
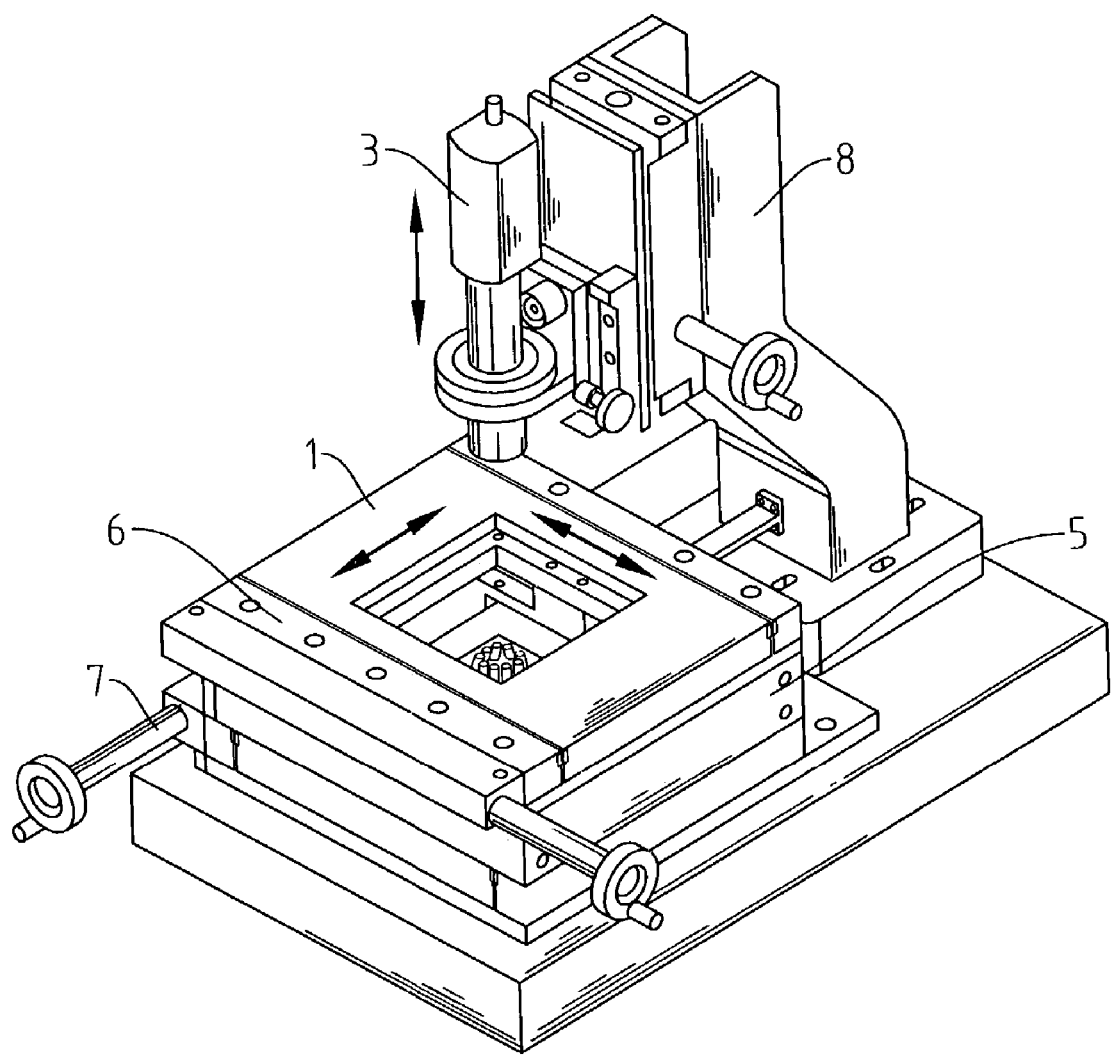
FIG. 1 is a three-dimensional illustration for better application in the present invention.
Figure 2:
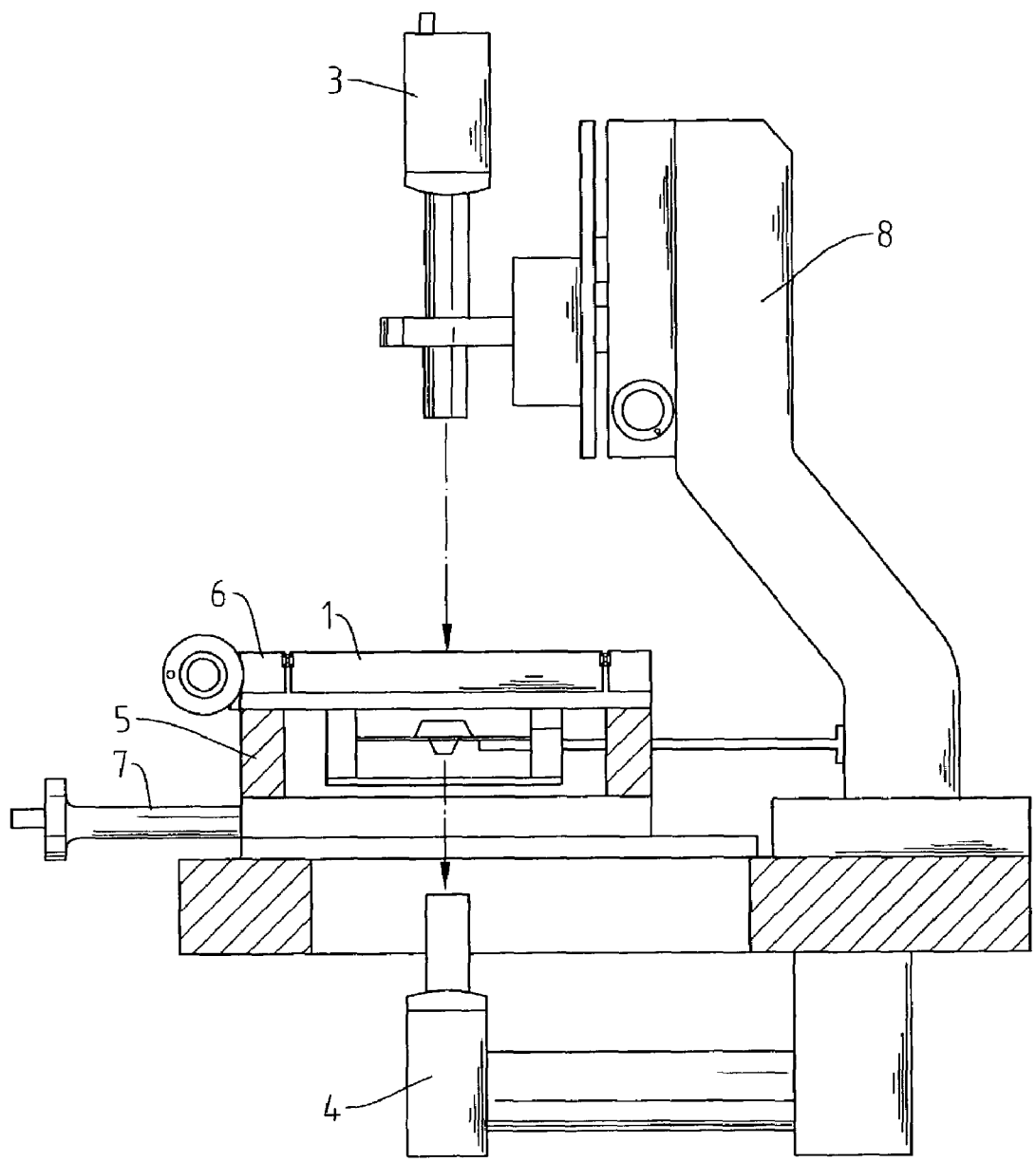
FIG. 2 is an illustration for formation about the better application in the present invention.

Please refer to FIGS. 1 to 2. The sophisticated surveying instrument with a coordinate board for position identification in the present invention consists of a workbench 1, a coordinate board 2 and two sets of optical sensors 3, 4, which may be CCD or CMOS digital camera lens.

The above workbench 1 installed on the base 5 moves by means of the two tracks 6, 7 in X and Y dimension. The movement could be implemented manually or through the movement of the screw link.

Figure 3:
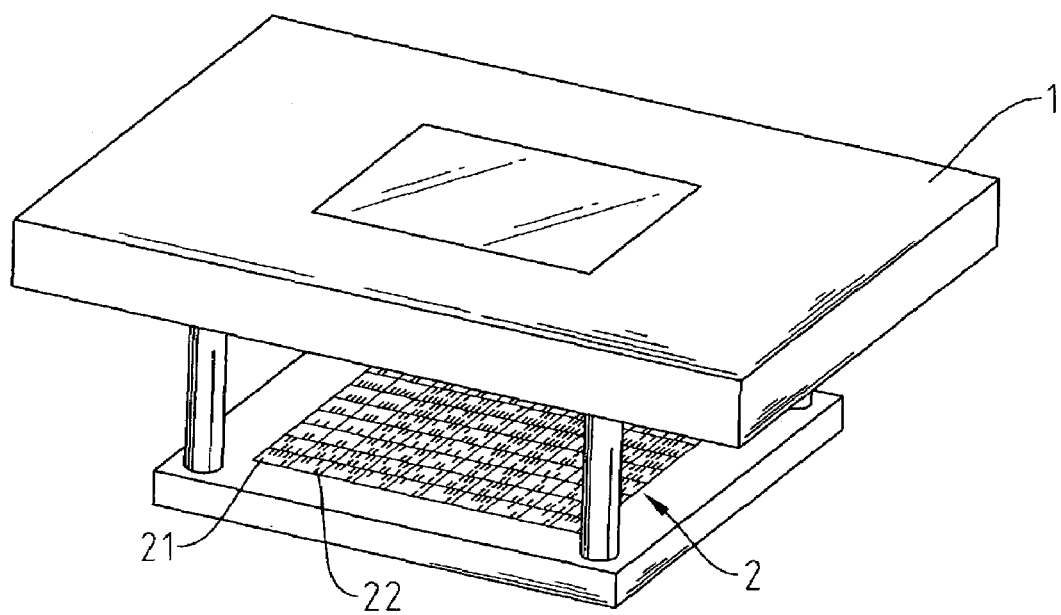
FIG. 3 is a three-dimensional illustration for the form factor of the workbench and the connected coordinate board in the present invention.
Figure 4:
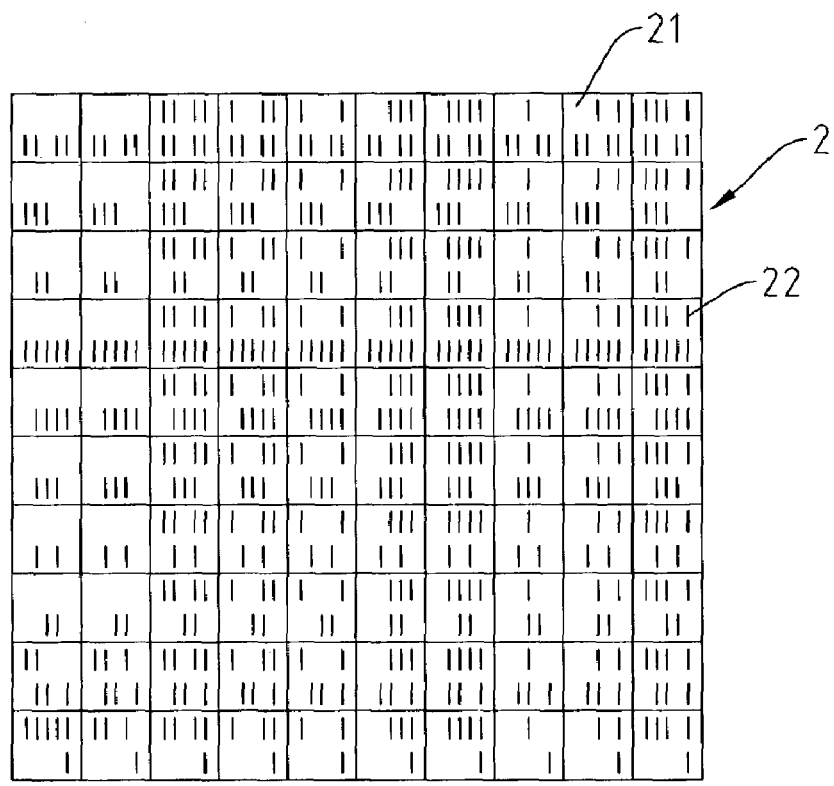
FIG. 4 is a partial plane illustration for the coordinate board in the present invention.
Figure 5:
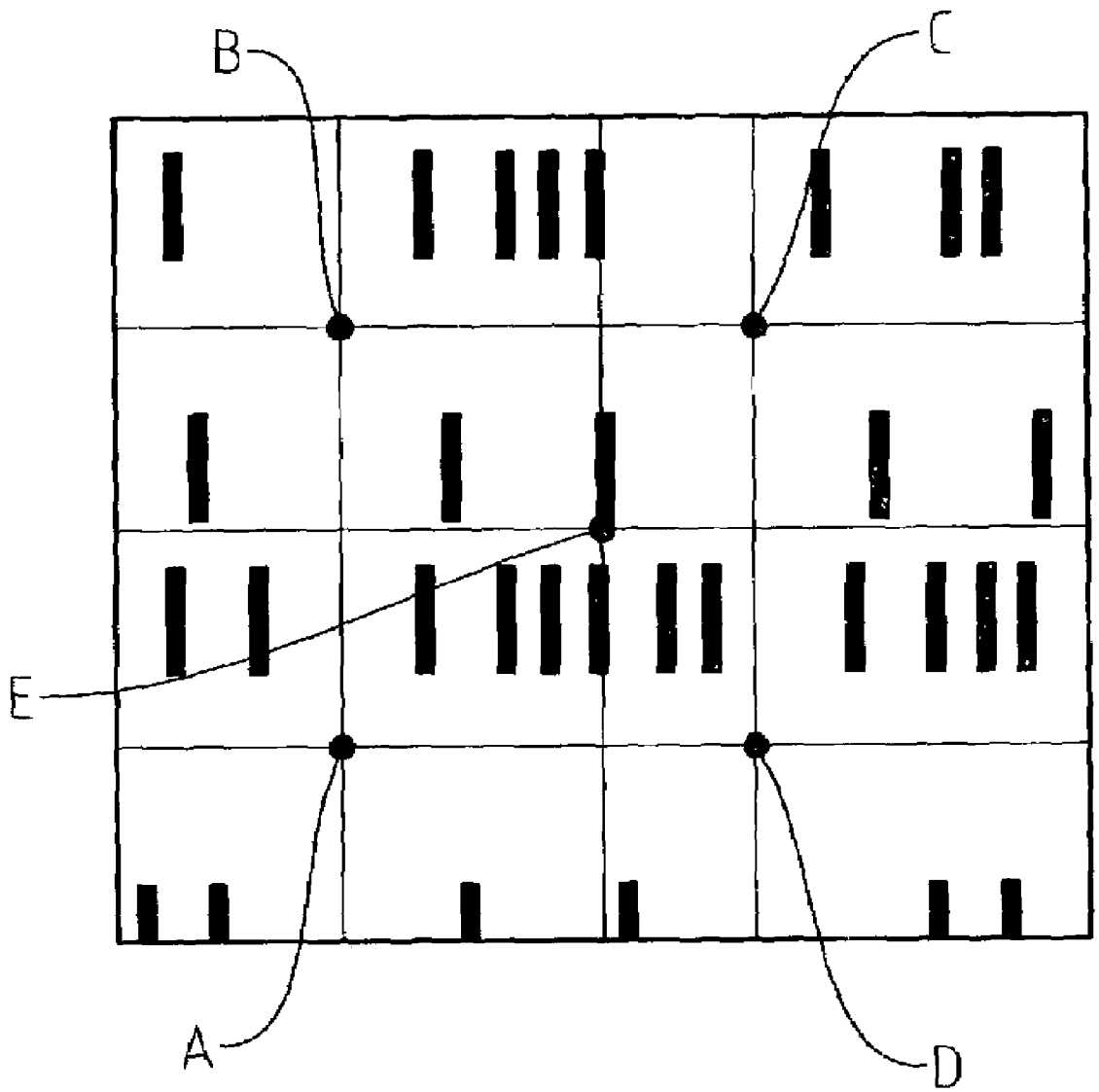
FIG. 5 is a zoom-in thumbnail about the projected pixel block in FIG. 4.

As shown in FIG. 3, the connected coordinate board 2 is secured beneath the workbench 1. Manufactured as a delicate wafer instrument, the coordinate board 2 is divided into a plurality of equal-sized square grids 21. Each of the plurality of equal-sized square grids 21 has a recognizable icon 22 (as shown in FIG. 4). Each recognizable icon 22 is a general computer code having data of coordinate positions of four apexes A, B, C, D (as shown in FIG. 5) of each grid 21 of the plurality of equal-sized square grids 21 and defining data of an apex coordinate that is read by the digital camera lens 3, 4. The apex coordinate is the coordinate positions of each of four apexes of the grid 21. The recognizable icon 22 could be symbols, bar codes and numbers.

Two sets of optical sensors 3, 4 are fixed above and beneath the base 5 by a link 8. One optical sensor 3 is placed above the workbench 1 that projects against the workbench 1 to define starting and end points while the other optical sensor 4 placed beneath the coordinate board 2 projects a pixel block against the grid 21 on the coordinate board 2. The starting point is found first followed by the end point. The recognizable icon 22 is read through the pixel block of the other optical sensor 4 projected on the coordinate board 2. Data from the recognizable icon 22 is transmitted to a connected electronic computer for analyzing, comparing and converting. The analyzing, comparing and converting are a series of three different processes. These processes are similar to a general digital photograph processes and are not the key features of the Present invention. Thus, the detailed descriptions of these processes are omitted. A position of a pixel block center E (see FIG. 5) is obtained by using the digital camera lens 3, 4 reading the data of the recognizable icon 22 and transmitting the data to the electronic computer that identifies the position of the pixel block center E from the coordinate board 2 and defines the corresponding coordinate values of the starting and end points relative to a set of axis of the coordinate board 2. When an object is placed on the workbench 1, the optical sensors 3, 4 can obtain position data for a first point of the coordinate board 2 so as to obtain the starting points values. The values of the end point are obtained after a movement of the object. These starting and end points refer to the starting and end points of the object on the work bench read by the optical sensor 3.

When an object is placed on the workbench 1, the optical sensors 3, 4 obtain the position data of the first point of the coordinate board 2 so as to obtain values of the starting point. As the workbench moves enabling the optical sensor to project against the end point of the object surveyed, the corresponding coordinate board is also moved. In this way, the pixel block of the fixed optical sensor is projected against another position on the coordinate board, a second point of the coordinate board. At this moment, the projected pixel block of the fixed optical sensor 4 on the coordinate board identifies the recognizable icon within the block and transmits the data to the electronic computer for comparison, analysis and conversion. Thus, the position of the pixel block center E of the second point of the coordinate board is identified, the corresponding coordinate value of the end point being defined, and the displacement distance between the starting point and the end point of the object is measured. This present invention replaces traditional measurement done by a linear sensor, while at the same time maintains the accuracy of measurement without being influenced by the size error or mismatch of the workbench track.

FIG. 5 illustrates the recognizable icon 22 within the pixel block projected by the other optical sensor 4 against the coordinate board 2. Each recognizable icon 22 is a general computer code having data of the coordinate position of each of four apexes A, B, C, D of the grid 21 allowing the digital camera lens to read the data of the coordinate position. The optical sensors 4 identifies the recognizable icon 22 within the pixel icon projected on the coordinate board 2 and inputs data from the recognizable icon 22 into the connected electronic computer to find a complete square grid 21. The recognizable icon 22 has the data of coordinate position of each of four apexes A, B, C, D of the grid 21, and the data for the complete square grid is thus obtainable. The boundaries of the complete square grid 21 are defined by connection lines among the four points A, B, C, and D. By finding the four apex coordinate values A, B, C, D of the grid 21 in accordance with the icon 22, the coordinate value of the pixel block center E is compared, analyzed and calculated.

As mentioned above, by defining the starting and end points of the object placed on the workbench 1 for surveying with the optical sensor 3 and by projecting the pixel block against the coordinate board 2 with the other optical sensor 2 to identifies the recognizable icon 22 which is then input to an electronic computer, for analysis, comparison and conversion, the position of the pixel block's center against the coordinate board 2 is identified and the corresponding coordinate value of the starting point of the object is defined. As the workbench 1 moves, enabling the optical sensor 3 to project against the end point of the object being surveyed, the corresponding coordinate board is moved. In this way, the pixel block of the fixed optical sensor 4 is projected on somewhere else on the coordinate board 2. At this moment, the pixel block projected on the coordinate board 2 also identifies the recognizable icon within the block and input it to an electronic computer for comparison, analysis and conversion. Thus, the position of the pixel block's center against the coordinate board 2 is identified; the corresponding coordinate value of the end point is defined, and the displacement distance between the starting point and the end point of the object is measured. Thus, this present invention replaces traditional measurement done by a linear sensor, while at the same time maintains the accuracy of measurement without being influenced by the size error or mismatch of the workbench track.

Furthermore, by fixing a connected coordinate board 2 beneath the workbench 1 with two sets of optical sensors 3, 4 placed above and beneath correspondingly, the installation space of the machine is saved. Besides, by connecting the coordinate board 2 with the workbench 1, regardless of its position above or beneath the workbench 1, and with two optical sensors 3, 4 projecting against the workbench 1 and the coordinate 2 respectively, the position is identified with the coordinate board 2, in the place of traditional linear sensors, thus enhances accuracy of measurement.

What is claimed is:

1. A surveying instrument for measuring starting and end points of an object with a computer, the surveying instrument comprising:
    a) a base;
    b) a work bench located on the base;
    c) two tracks selectively moving the base and the workbench in a horizontal plane;
    d) a coordinate board connected to and located below the work bench and having a plurality of grids located thereon, each of the plurality of grids being a square and having an equal-size and a recognizable icon located thereon;
    e) a first optical sensor located above and projecting towards the work bench; and
    f) a second optical sensor located below the coordinate board and projecting towards the coordinate board, the recognizable icon being a computer code readable by the second optical sensor, the first optical sensor and the second optical sensor are connected to the computer,
  wherein, when the object is placed on the work bench, the first optical sensor identifying the starting point, the second optical sensor reading a first recognizable icon of a first grid of the plurality of grids and transferring data of the first recognizable icon to the computer to determine a first pixel block center and defining a value of the starting point, and, when the object is moved by the two tracks, the object, the work bench, and the coordinate board move together and the coordinate board move together, the first optical sensor identifying the end point, the second optical sensor reading a second recognizable icon of a second grid of the plurality of grids and transferring data of the second recognizable icon to the computer to determine a second pixel block center and defining a value of the end point.

2. The surveying instrument according to claim 1, wherein the recognizable icon is selected from a group consisting of a symbol, bar code, and numbers.

3. The surveying instrument according to claim 1, further comprising a link connected to and positioning the first optical sensor and the second optical sensor relative to the work bench.

* * * * *